(12) United States Patent
Kim et al.

(10) Patent No.: US 12,497,501 B2
(45) Date of Patent: Dec. 16, 2025

(54) CARBOXYLIC ACID-MODIFIED NITRILE-BASED COPOLYMER LATEX COMPOSITION, LATEX COMPOSITION FOR DIP MOLDING INCLUDING THE SAME, AND MOLDED ARTICLE THEREFROM

(71) Applicant: LG Chem, Ltd., Seoul (KR)

(72) Inventors: Jung Eun Kim, Daejeon (KR); Ji Hyun Kim, Daejeon (KR); Seung Uk Yeu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 965 days.

(21) Appl. No.: 16/976,279

(22) PCT Filed: Nov. 1, 2019

(86) PCT No.: PCT/KR2019/014719
§ 371 (c)(1),
(2) Date: Aug. 27, 2020

(87) PCT Pub. No.: WO2020/130330
PCT Pub. Date: Jun. 25, 2020

(65) Prior Publication Data
US 2021/0054177 A1    Feb. 25, 2021

(30) Foreign Application Priority Data
Dec. 19, 2018    (KR) .................. 10-2018-0165190

(51) Int. Cl.
| | | |
|---|---|---|
| C08F 220/46 | (2006.01) | |
| B29C 41/00 | (2006.01) | |
| B29C 41/14 | (2006.01) | |
| C08F 36/06 | (2006.01) | |
| C08K 3/06 | (2006.01) | |
| C08K 3/22 | (2006.01) | |
| C08K 5/00 | (2006.01) | |
| C08L 13/02 | (2006.01) | |
| B29K 19/00 | (2006.01) | |
| B29K 33/18 | (2006.01) | |
| C08F 220/28 | (2006.01) | |
| C08F 228/02 | (2006.01) | |

(52) U.S. Cl.
CPC ............ *C08L 13/02* (2013.01); *B29C 41/003* (2013.01); *B29C 41/14* (2013.01); *C08F 220/46* (2013.01); *C08K 3/06* (2013.01); *C08K 3/22* (2013.01); *C08K 5/0025* (2013.01); *B29K 2019/00* (2013.01); *B29K 2033/18* (2013.01); *C08F 220/283* (2020.02); *C08F 228/02* (2013.01); *C08K 2003/2296* (2013.01)

(58) Field of Classification Search
CPC .. C08L 13/02; C08J 2313/02; B29K 2033/18; C08F 220/44; C08F 220/06; C08F 220/46
See application file for complete search history.

(56) References Cited

U.S. PATENT DOCUMENTS

| | | | |
|---|---|---|---|
| 5,171,768 A | 12/1992 | Prentice et al. | |
| 2003/0176556 A1 | 9/2003 | Hagiopol | |
| 2012/0149859 A1* | 6/2012 | Yang | ............... C08J 5/02 |
| | | | 526/287 |
| 2014/0065336 A1 | 3/2014 | Nakashima et al. | |
| 2016/0122457 A1* | 5/2016 | Katada | ............... C08C 19/36 |
| | | | 525/329.3 |
| 2016/0340617 A1 | 11/2016 | Orizet et al. | |
| 2017/0015819 A1 | 1/2017 | Enomoto et al. | |
| 2017/0268164 A1 | 9/2017 | Daum et al. | |
| 2017/0327669 A1 | 11/2017 | Ng et al. | |
| 2020/0062879 A1* | 2/2020 | Simpson | ............... D06M 15/31 |

FOREIGN PATENT DOCUMENTS

| | | | | |
|---|---|---|---|---|
| CN | 102459370 A | 5/2012 | | |
| JP | H05279407 A | 10/1993 | | |
| JP | 2017504711 A | 2/2017 | | |
| KR | 20100041342 A | 4/2010 | | |
| KR | 20100133638 A | 12/2010 | | |
| KR | 20140053859 A | 5/2014 | | |
| KR | 20170094156 A | 8/2017 | | |
| KR | 20170106295 A | 9/2017 | | |
| WO | WO-2018111087 A1 * | 6/2018 | ............. B29C 41/14 |

OTHER PUBLICATIONS

International Search Report for Application No. PCT/KR2019/014719, mailed Feb. 12, 2020, pp. 1-2.

* cited by examiner

*Primary Examiner* — Karuna P Reddy
(74) *Attorney, Agent, or Firm* — Lerner David LLP

(57) ABSTRACT

Provided is a carboxylic acid-modified nitrile-based copolymer latex composition, and more particularly, a carboxylic acid-modified nitrile-based copolymer latex composition including a carboxylic acid-modified nitrile-based copolymer. The carboxylic acid-modified nitrile-based copolymer includes a carboxyalkyl (meth)acrylate monomer-derived repeating unit and a repeating unit derived from an ethylenic unsaturated sulfonic acid monomer including a sulfonate salt or a sulfonate ester. A latex composition for dip molding including the same, and a molded article therefrom are also provided.

4 Claims, No Drawings

CARBOXYLIC ACID-MODIFIED NITRILE-BASED COPOLYMER LATEX COMPOSITION, LATEX COMPOSITION FOR DIP MOLDING INCLUDING THE SAME, AND MOLDED ARTICLE THEREFROM

CROSS-REFERENCE TO RELATED APPLICATIONS

The present application is a national stage entry under 35 U.S.C. § 371 of International Application No. PCT/KR2019/014719 filed on Nov. 1, 2019, which claims priority to Korean Patent Application No. 10-2018-0165190, filed on Dec. 19, 2018, the entire contents of which are incorporated herein as a part of the specification.

TECHNICAL FIELD

The present invention relates to a carboxylic acid-modified nitrile-based copolymer latex composition, and more particularly, to a carboxylic acid-modified nitrile-based copolymer latex composition, a latex composition for dip molding including the same, and a molded article therefrom.

BACKGROUND ART

Conventionally, a natural rubber has been mainly used as a raw material of products requiring elasticity such as industrial, medical, and food gloves, balloons, and condoms. However, in recent years, since the natural rubber has produced a side effect of causing a serious protein allergy n some users, the natural rubber is replaced with a nitrile-based rubber. Since the nitrile-based rubber has high oil resistance, it is used a lot in working gloves used by users dealing with an organic solvent, or medical and food gloves. In addition, products manufactured from the nitrile-based rubber have properties of being not easily perforated by an injection needle or the like, as compared with the products manufactured from the natural rubber, and thus, are appropriate for use by medical personnel dealing with a sharp scalpel, an injection needle, or the like.

In addition, in recent years, in many glove manufacturing companies, production lines have been switched from a natural rubber glove line to a nitrile-based rubber glove line due to instable supply and demand of natural rubber, and with increased awareness of safety, use of disposable gloves manufactured from the nitrile-based rubber is continuously increased.

Keeping up with this trend, the glove manufacturing companies aim at manufacturing gloves that are thin but not torn easily in order to increase the productivity of gloves, and for this, a latex for dip molding which allows the manufacture of gloves showing high tensile strength is demanded. In the manufacture of gloves, as one of the biggest factors affecting tensile strength, an ionic bond occurring between a methacrylic acid which is one of the monomers used in the preparation of the latex for dip molding and zinc ions of zinc oxide added to a latex composition for dip molding may be mentioned. Depending on how many ionic bonds are produced, the tensile strength of gloves is determined.

Meanwhile, in order to improve the physical properties such as tensile strength and durability of gloves, it is necessary to increase a speed of a film formation process during the manufacture of gloves, and when the speed is increased, workability during the manufacture of gloves is deteriorated. In particular, syneresis which is one of the physical properties represented as workability a is phenomenon in which particles in the latex aggregate so that dewatering occurs, and when a film formation speed is increased during the manufacture of gloves, a syneresis speed as such becomes increased. When the syneresis speed is too fast, latex stability of the latex composition for dip molding is reduced to produce an agglomerate, which causes glove defects. In addition, when workability is not good, a latex-flowing shape (flow mark) occurs on the glove, or the glove has the agglomerate, so that the appearance of the glove becomes bad.

DISCLOSURE

Technical Problem

The problems to be solved in the present invention is to improve the tensile strength of a dip-molded article manufactured by dip molding, to decrease a modulus at 300% to improve a wearing sensation, and to improve workability at the same time, in order to solve the problems mentioned in the Background Art.

That is, an object of the present invention is to provide a carboxylic acid-modified nitrile-based copolymer latex composition for manufacturing a dip-molded article in which during the manufacture of dip-molded articles such as gloves using the latex composition for dip molding, a modulus at 300% is low while workability is improved, so that the wearing sensation of gloves is excellent, and tensile strength is high so that even a thin glove is not torn easily, a latex composition for dip molding including the same, and a dip-molded article therefrom.

Technical Solution

In one general aspect, a carboxylic acid-modified nitrile-based copolymer latex composition includes a carboxylic acid-modified nitrile-based copolymer, wherein the carboxylic acid-modified nitrile-based copolymer includes a carboxyalkyl (meth)acrylate monomer-derived repeating unit and a repeating unit derived from an ethylenic unsaturated sulfonic acid monomer including a sulfonate salt or a sulfonate ester.

In another general aspect, a latex composition for dip molding includes the carboxylic acid-modified nitrile-based copolymer latex composition and a crosslinker composition. In still another general aspect, a molded article includes a layer derived from the latex composition for dip molding.

Advantageous Effects

The latex composition for dip molding including the carboxylic acid-modified nitrile-based copolymer latex composition according to the present invention improves a binding force with zinc oxide, and thus, when a dip-molded article such as gloves is manufactured using the latex composition for dip molding, the manufactured dip-molded article has improved tensile strength and an improved wearing sensation due to a lowered modulus at 300%, and workability is improved at the same time.

BEST MODE

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

Hereinafter, the present invention will be described in more detail for understanding the present invention.

In the present invention, the term, "derived repeating unit" may refer to a component, a structure or a material itself derived from a specific material, and as a specific example, "derived repeating unit" may refer to the repeating unit formed in the polymer by the added monomer participating in the polymerization reaction during the polymerization of a polymer.

The term, "latex" in the present invention may refer to a polymer polymerized by polymerization or a copolymer being present in a form dispersed in water, and as a specific example, may refer to fine particles of a polymer in a rubber phase or a copolymer in a rubber phase polymerized by emulsion polymerization being present in a form dispersed in water in a colloid state.

The term, "layer derived" in the present invention may refer to a layer formed from a polymer or a copolymer, and as a specific example, may refer to a layer formed from a polymer or a copolymer in which the polymer or the copolymer is attached, fixed, and/or polymerized on a dip mold during the manufacture of a dip-molded article.

The term, "crosslinker-derived crosslinking part" in the present invention may refer to a component, a structure, or a material itself caused by a compound, or a crosslinking part performing crosslinking in a polymer or between polymers, formed by the action and reaction of the crosslinker composition.

The carboxylic acid-modified nitrile-based copolymer latex composition according to the present invention may include a carboxylic acid-modified nitrile-based copolymer.

The carboxylic acid-modified nitrile-based copolymer may include a carboxyalkyl (meth)acrylate monomer-derived repeating unit and a repeating unit derived from an ethylenic unsaturated sulfonic acid monomer including a sulfonate salt or a sulfonate ester.

According to an exemplary embodiment of the present invention, the carboxyalkyl (meth)acrylate monomer-derived repeating unit and the ethylenic unsaturated sulfonic acid monomer-derived repeating unit may form the carboxylic acid-modified nitrile-based copolymer with a monomer forming the carboxylic acid-modified nitrile-based copolymer or repeating units derived from each of the monomers, or include both the carboxyalkyl (meth)acrylate monomer-derived repeating unit and the ethylenic unsaturated sulfonic acid monomer-derived repeating unit in the carboxylic acid-modified nitrile-based copolymer, thereby improving the tensile properties such as tensile strength of a molded article manufactured from a latex composition for dip molding including the carboxylic acid-modified nitrile-based copolymer latex composition including the carboxylic acid-modified nitrile-based copolymer, lowering a modulus at 300% to improve a wearing sensation, and improving workability at the same time.

According to an exemplary embodiment of the present invention, the carboxyalkyl (meth)acrylate monomer forming the carboxyalkyl (meth)acrylate monomer-derived repeating unit may be one or more selected from the group consisting of carboxyethyl (meth)acrylate, carboxypropyl (meth)acrylate, and carboxypentyl (meth)acrylate, and as a specific example, may be carboxyethyl (meth)acrylate.

The content of the carboxyalkyl (meth)acrylate monomer-derived repeating unit may be 0.1 wt % to 10 wt %, 1 wt % to 8 wt %, or 2 wt % to 6 wt %, based on the total content of the carboxylic acid-modified nitrile-based copolymer, and within the range, workability is improved.

According to an exemplary embodiment of the present invention, the ethylenic unsaturated sulfonic acid monomer forming the repeating unit derived from an ethylenic unsaturated sulfonic acid monomer including a sulfonate salt or a sulfonate ester may be one or more selected from the group consisting of sodium vinylsulfonate, sodium (meth)allyl sulfonate, a sodium 2-methyl-2-propen-1-sulfonate salt, a sodium 2-acrylamido-2-methylpropane sulfonate salt, 3-sulfopropyl (meth)acrylate, sodium α-methylstyrene sulfonate, sodium ethylstyrene sulfonate, and sodium 1-allyloxy-2-hydroxypropyl sulfonate, and as a specific example, may be sodium 1-allyloxy-2-hydroxypropyl sulfonate.

The content of the ethylenic unsaturated sulfonic acid monomer-derived repeating unit may be 0.1 wt % to 10 wt %, 1 wt % to 7 wt %, or 2 wt % to 5 wt %, based on the total content of the carboxylic acid-modified nitrile-based copolymer, and within the range, workability is improved.

The carboxylic acid-modified nitrile-based copolymer in the carboxylic acid-modified nitrile-based copolymer latex composition according to the present invention includes the carboxyalkyl (meth)acrylate monomer-derived repeating unit and the ethylenic unsaturated sulfonic acid monomer-derived repeating unit, thereby allowing a carboxylic acid to be present on the surface of carboxylic acid-modified nitrile-based copolymer particles and imparting polymerization stability to increase binding force with zinc oxide. In addition, the tensile properties such as tensile strength of a molded article manufactured from a latex composition for dip molding including the carboxylic acid-modified nitrile-based copolymer latex composition including the carboxylic acid-modified nitrile-based copolymer are improved, a modulus at 300% is lowered to improve a wearing sensation, and workability is improved at the same time.

Meanwhile, when each monomer for forming the carboxyalkyl (meth)acrylate monomer-derived repeating unit or the ethylenic unsaturated sulfonic acid monomer-derived repeating unit is used alone, it is not easy to carry out a reaction with the monomers included in the carboxylic acid-modified nitrile-based copolymer in the carboxylic acid-modified nitrile-based copolymer latex composition, and thus, the carboxyalkyl (meth)acrylate monomer or the ethylenic unsaturated sulfonic acid monomer is not bonded to the carboxylic acid-modified nitrile-based copolymer particles, thereby deteriorating polymerization stability.

According to an exemplary embodiment of the present invention, the ethylenic unsaturated sulfonic acid monomer-derived repeating unit and the carboxyalkyl (meth)acrylate monomer-derived repeating unit included in the carboxylic acid-modified nitrile-based copolymer in the carboxylic acid-modified nitrile-based copolymer latex composition may be included at a weight ratio of 1:1 to 5, 1:1 to 4.5, or 1:1 to 3, and within the range, the monomers for forming the ethylenic unsaturated sulfonic acid monomer-derived repeating unit and the carboxyalkyl (meth)acrylate monomer-derived repeating unit are bonded to the carboxylic acid-modified nitrile-based copolymer particles to adjust a carboxylic acid distribution and improve polymerization stability. In addition, the monomers for forming the ethylenic unsaturated sulfonic acid monomer-derived repeating unit and the carboxyalkyl (meth)acrylate monomer-derived repeating unit are hydrophilic monomers and increase the property that the carboxylic acid-modified nitrile-based copolymer particles swell in water, thereby improving workability.

According to an exemplary embodiment of the present invention, the carboxylic acid-modified nitrile-based copolymer may include a conjugated diene-based monomer-derived repeating unit, an ethylenic unsaturated nitrile-based monomer-derived repeating unit, and ethylenic unsaturated acid monomer-derived repeating unit, together with the carboxyalkyl (meth)acrylate monomer-derived repeating unit and the ethylenic unsaturated sulfonic acid monomer-derived repeating unit. That is, the carboxylic acid-modified nitrile-based copolymer according to an exemplary embodiment of the present invention may include the conjugated diene-based monomer-derived repeating unit, the ethylenic unsaturated nitrile-based monomer-derived repeating unit, the ethylenic unsaturated acid monomer-derived repeating unit, the carboxyalkyl (meth)acrylate monomer-derived repeating unit, and the ethylenic unsaturated sulfonic acid monomer-derived repeating unit. As a specific example, the carboxylic acid-modified nitrile-based copolymer may include 40 wt % to 80 wt % of the conjugated diene-based monomer-derived repeating unit, 10 wt % to 50 wt % of the ethylenic unsaturated nitrile-based monomer-derived repeating unit, 0.1 wt % to 10 wt % of the ethylenic unsaturated acid monomer-derived repeating unit, 0.1 wt % to 10 wt % of the carboxyalkyl (meth)acrylate monomer-derived repeating unit, and 0.1 wt % to 10 wt % of the ethylenic unsaturated sulfonic acid monomer-derived repeating unit.

According to an exemplary embodiment of the present invention, the conjugated diene-based monomer forming the conjugated diene-based monomer-derived repeating unit may be one or more selected from the group consisting of 1,3-butadiene, 2,3-dimethyl-1,3-butadiene, 2-ethyl-1,3-butadiene, 1,3-pentadiene, and isoprene, as a specific example, may be 1,3-butadiene or isoprene, and as a more specific example, may be 1,3-butadiene.

The content of the conjugated diene-based monomer-derived repeating unit may be 40 wt % to 80 wt %, 45 wt % to 80 wt %, or 45 wt % to 70 wt %, based on the total content of the carboxylic acid-modified nitrile-based copolymer, and within the range, a dip-molded article molded from the latex composition for dip molding including the carboxylic acid-modified nitrile-based copolymer latex composition including the carboxylic acid-modified nitrile-based copolymer is flexible, has an excellent wearing sensation, and has excellent oil resistance and tensile strength at the same time.

In addition, according to an exemplary embodiment of the present invention, the ethylenic unsaturated nitrile-based monomer forming the ethylenic unsaturated nitrile-based monomer-derived repeating unit may be one or more selected from the group consisting of acrylonitrile, methacrylonitrile, fumaronitrile, α-chloronitrile, and α-cyanoethylacrylonitrile, as a specific example, may be acrylonitrile and methacrylonitrile, and a more specific example, may be acrylonitrile.

The content of the ethylenic unsaturated nitrile-based monomer-derived repeating unit may be 10 wt % to 50 wt %, 15 wt % to 50 wt %, or 15 wt % to 45 wt %, based on the total content of the carboxylic acid-modified nitrile-based copolymer, and within the range, a dip-molded article molded from the latex composition for dip molding including the carboxylic acid-modified nitrile-based copolymer latex composition including the carboxylic acid-modified nitrile-based copolymer is flexible, has an excellent wearing sensation, and has excellent oil resistance and tensile strength at the same time.

In addition, according to an exemplary embodiment of the present invention, the ethylenic unsaturated acid monomer forming the ethylenic unsaturated acid monomer-derived repeating unit may be an ethylenic unsaturated monomer containing an acid group such as a carboxyl group, a sulfonic acid group, and an acid anhydride group, specific examples thereof may be one or more selected from the group consisting of ethylenic unsaturated carboxylic acid monomers such as acrylic acid, methacrylic acid, itaconic acid, maleic acid, and fumaric acid; polycarboxylic acid anhydrides such as anhydrous maleic acid and anhydrous citraconic acid; ethylenic unsaturated sulfonic acid monomers such as styrene sulfonic acid; and ethylenic unsaturated polycarboxylic acid partial ester monomers such as monobutyl fumarate, monobutyl maleate, and mono-2-hydroxypropyl maleate, more specific examples thereof may be one or more selected from the group consisting of acrylic acid, methacrylic acid, itaconic acid, maleic acid, and fumaric acid, and still more specific examples may be acrylic acid or methacrylic acid.

The ethylenic unsaturated acid monomer may be used in the form of a salt such as an alkali metal salt or an ammonium salt during polymerization. In addition, the content of the ethylenic unsaturated acid monomer-derived repeating unit may be 0.1 wt % to 10 wt %, 0.5 wt % to 9 wt %, or 2 wt % to 8 wt %, based on the total content of the carboxylic acid-modified nitrile-based copolymer, and within the range, the dip-molded article molded from the latex composition for dip molding including the carboxylic acid-modified nitrile-based copolymer latex composition including the carboxylic acid-modified nitrile-based copolymer is flexible, has an excellent wearing sensation, and has excellent tensile strength at the same time.

In addition, the present invention provides a method of preparing a carboxylic acid-modified nitrile-based copolymer latex composition for preparing the carboxylic acid-modified nitrile-based copolymer latex composition.

According to an exemplary embodiment of the present invention, a method of preparing the carboxylic acid-modified nitrile-based copolymer latex composition may include polymerizing a monomer mixture including 40 wt % to 80 wt % of the conjugated diene-based monomer, 10 wt % to 50 wt % of the ethylenic unsaturated nitrile-based monomer, 0.1 wt % to 10 wt % of the ethylenic unsaturated acid monomer, 0.1 wt % to 10 wt % of the carboxyalkyl (meth)acrylate monomer, and 0.1 wt % to 10 wt % of the ethylenic unsaturated sulfonic acid monomer, based on the total content of the monomer mixture to prepare the carboxylic acid-modified nitrile-based copolymer latex composition including the carboxylic acid-modified nitrile-based copolymer.

According to an exemplary embodiment of the present invention, the polymerization may be performed by emulsion polymerization. The polymerization may be performed by the polymerization of the monomer mixture, and each monomer included in the monomer mixture may be added as the kind of the monomer at the content described above, batchwise or continuously.

In addition, according to an exemplary embodiment of the present invention, the polymerization may be performed in the presence of an emulsifying agent, a polymerization initiator, a molecular weight adjusting agent, and the like.

When the polymerization is performed by including the emulsifying agent, the emulsifying agent may be, as an example, one or more selected from the group consisting of anionic surfactants, nonionic surfactants, cationic surfactants, and positive surfactants, and as a specific example, may be one or more anionic surfactants selected from the group consisting of alkylbenzenesulfonate salts, aliphatic sulfonate salts, higher alcohol sulfate salts, α-olefin sulfonate salts, and alkylether sulfate ester salts. In addition, the emulsifying agent may be added at 0.3 parts by weight to 10 parts by weight, 0.8 parts by weight to 8 parts by weight, or 1.5 parts by weight, to 6 parts by weight, and within the range, polymerization stability is excellent and a foam generation amount is small, and thus, it is easy to produce the molded article.

In addition, when the polymerization is performed by including a polymerization initiator, the polymerization initiator may be, as an example, a radical initiator, as a specific example, may be one or more selected from the group consisting of inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butylperoxy isobutylate; and nitrogen compounds such as azobisisobtyronitrile, azobis-2,4-dimethylvaleronitrile, azobiscyclohexanecarbonitrile, and methyl azobisisobutyrate, as a specific example, may be an inorganic peroxide, and as a more specific example, may be a persulfate salt. In addition, the polymerization initiator may be added at 0.01 parts by weight to 2 parts by weight, or 0.02 parts by weight to 1.5 parts by weight, based on the total content of 100 parts by weight of the monomer mixture, and within the range, a polymerization rate may be maintained at an appropriate level.

In addition, when the polymerization is performed by including a molecular weight adjusting agent, the molecular weight adjusting agent may be, as an example, one or more selected from the group consisting of α-methylstyrene dimers; mercaptans such as t-dodecylmercaptan, n-dodecylmercaptan, and octylmercaptan; halogenated hydrocarbons such as carbon tetrachloride, methylene chloride, and methylene bromide; sulfur-containing compounds such as tetrethylthiuram disulfide, dipentamethylenethiuram disulfide, and diisopropylxanthogen disulfide, and as specific example, may be t-dodecylmercaptan. In addition, the molecular weight adjusting agent may be added at 0.1 parts by weight to 2.0 parts by weight, 0.2 parts by weight to 1.5 parts by weight, or 0.3 parts by weight to 1.0 parts by weight, based on the total content of 100 parts by weight of the monomer mixture, and within the range, polymerization stability is excellent and when a molded article is manufactured after the polymerization, the molded article has excellent physical properties.

In addition, according to an exemplary embodiment of the present invention, the polymerization may be performed by including an activator, and the activator may be, as an example, one or more selected from the group consisting of sodium ethylenediamine sodium formaldehyde sulfoxylate, tetraacetate, ferrous sulfate, dextrose, sodium pyrrolinate, and sodium sulfite. In addition, for example, the activator may be added to at 0.001 parts by weight to 5 parts by weight, based on the total content of 100 parts by weight of the monomer mixture.

In addition, according to an exemplary embodiment of the present invention, the polymerization may be performed in water, as a specific example, deionized water as a medium, and for securing polymerization ease, the polymerization may be performed by further including an additive such as a chelating agent, a dispersing agent, a pH adjusting agent, a deoxidation agent, a particle diameter adjusting agent, an anti-aging agent, and an oxygen scavenger. According to an exemplary embodiment of the present invention, the emulsifying agent, the polymerization initiator, the molecular weight adjusting agent, the additive, and the like may be added batchwise or in portions to the polymerization reactor, and may be added continuously for each addition.

In addition, according to an exemplary embodiment of the present invention, the polymerization may be performed at a polymerization temperature of 10° C. to 90° C., 20° C. to 80° C., or 25° C. to 75° C., and within the range, latex stability is excellent.

In addition, according to an exemplary embodiment of the present invention, the method of preparing a carboxylic acid-modified nitrile-based copolymer latex may include completing the polymerization reaction to obtain the carboxylic acid-modified nitrile-based copolymer latex composition. The completion of the polymerization reaction may be performed at a point of a polymerization conversion rate of 90% or more or 95% or more. In addition, the method of preparing a carboxylic acid-modified nitrile-based copolymer latex may further include removing unreacted monomers by a deodorization process, after completing the polymerization reaction.

In addition, according to the present invention, a latex composition for dip molding including the carboxylic acid-modified nitrile-based copolymer latex, is provided. The latex composition for dip molding may include the carboxylic acid-modified nitrile-based copolymer and a crosslinker composition. According to an exemplary embodiment of the present invention, the crosslinker composition may be for forming a crosslinker-derived crosslinking part by a crosslinking reaction with the carboxylic acid-modified nitrile-based copolymer.

According to an exemplary embodiment of the present invention, the crosslinker composition may include a vulcanizer or a vulcanizing accelerator, and as a more specific example, may include a vulcanizer, a vulcanizing accelerator, and zinc oxide.

According to an exemplary embodiment of the present invention, the vulcanizer is for vulcanizing the latex composition for dip molding and may be sulfur, and as a specific example, may be sulfur such as sulfur powder, precipitated sulfur, colloidal sulfur, surface-treated sulfur, and insoluble sulfur. The content of the vulcanizer may be 0.1 parts by weight to 10 parts by weight or 1 part by weight to 5 parts by weight, based on the total content of 100 parts by weight (based on solid content) of the carboxylic acid-modified nitrile-based copolymer in the latex composition for dip molding, and within the range, crosslinking ability by sulfur is excellent.

In addition, according to an exemplary embodiment of the present invention, the vulcanizing accelerator may be one or more selected from the group consisting of 2-mercaptobenzothiazole (MBT), 2,2-dithiobisbenzothiazole-2-sulfenamide (MBTS), N-cyclohexylbenzothiasole-2-sulfenamide (CBS), 2-morpholinothiobenzothiazole (MBS), tetramethylthiuram monosulfide (TMTM), tetramethylthiuram disulfide (TMTD), zinc diethyldithiocarbamate (ZDEC), zinc di-n-butyldithiocarbamate (ZDBC), diphenylguanidine (DPG), and di-o-tolylguanidine. The content of the vulcanizing accelerator may be 0.1 parts by weight to 10 parts by weight or 0.5 parts by weight to 5 parts by weight, based on the total content of 100 parts by weight (based on solid content) of the carboxylic acid-modified nitrile-based copolymer in the latex composition for dip molding, and within the range, crosslinking ability by sulfur is excellent.

In addition, according to an exemplary embodiment of the present invention, the zinc oxide performs ionic bonding to a carboxyl group and the like of the carboxylic acid-modified nitrile-based copolymer in the latex composition for dip molding, and may be a crosslinker for forming a crosslinking part by ionic bonding between the carboxylic acid-modified nitrile-based copolymers or in the carboxylic acid-modified nitrile-based copolymer. The content of the zinc oxide may be 0.1 parts by weight to 5 parts by weight or 0.5 parts by weight to 4 parts by weight, based on the total content of 100 parts by weight (based on solid content) of the carboxylic acid-modified nitrile-based copolymer in the latex composition for dip molding, and within the range, crosslinking ability is excellent the tensile strength and flexibility of the manufactured dip-molded article are excellent.

In addition, according to an exemplary embodiment of the present invention, the latex composition dip molding may have, as an example, a solid content (concentration) of 8 wt % to 40 wt %, 8 wt % to 35 wt %, or 10 wt % to 35 wt %, and within the range, latex transportation efficiency is excellent and an increase in latex viscosity is prevented, so that storage stability is excellent.

As another example, the latex composition for dip molding may have a pH of 9 to 12, 9 to 11.5, or 9.5 to 11, and within the range, processability and productivity during the manufacture of the dip-molded article are excellent. The pH of the latex composition for dip molding may be adjusted by adding the pH adjusting agent described above. The pH adjusting agent may be, as an example, an aqueous potassium hydroxide solution having a concentration of 1 wt % to 5 wt %, or ammonia water having a concentration of 1 wt % to 5 wt %.

In addition, according to an exemplary embodiment of the present invention, the latex composition for dip molding may further include an additive, for example, a pigment such as titanium oxide, a filler such as silica, a thickener, a pH adjusting agent, and the like, if necessary.

According to the present invention, a molded article including a layer derived from the latex composition for dip molding is provided. The molded article may be a dip-molded article produced by dip molding of the latex composition for dip molding or a molded article including a layer derived from the latex composition for dip molding formed from the latex composition for dip molding by dip molding. A method of producing a molded article for molding the molded article may include immersing the latex composition for dip molding directly by a dipping method, an anode coagulation dipping method, a Teague coagulation dipping method, or the like, and as a specific example, may be performed by the anode coagulation dipping method, and in this case, a dip-molded article having a uniform thickness may be obtained.

As a specific example, the method of manufacturing a molded article may include adhering a coagulant to a dip mold (S100); immersing the dip mold to which the coagulant is adhered in the latex composition for dip molding to form a layer derived from the latex composition for dip molding, that is, a dip molding layer (S200); and heating the dip molding layer to crosslink the latex composition for dip molding (S300).

According to an exemplary embodiment of the present invention, the step (S100) is a step of soaking the dip mold in a coagulant solution for forming the coagulant in the dip mold to adhere the coagulant to the surface of the dip mold, and the coagulant solution is a solution in which a coagulant is dissolved in water, alcohol, or a mixture thereof and the content of the coagulant in the coagulant solution may be 5 wt % to 75 wt %, 10 wt % to 65 wt %, or 15 wt % to 55 wt %, based on the total content of the coagulant solution. The coagulant may be, as an example, one or more selected from the group consisting of metal halides such as barium chloride, calcium chloride, magnesium chloride, zinc chloride, and aluminum chloride; nitrate salts such as barium nitrate, calcium nitrate, and zinc nitrate; acetate salts such as barium acetate, calcium acetate, and zinc acetate; and sulfate such salts as calcium sulfate, magnesium sulfate, and aluminum sulfate, and as a specific example, may be calcium chloride or calcium nitrate. In addition, according to an exemplary embodiment of the present invention, the step (S100) may further include soaking the dip mold in the coagulant solution for 1 minute or more for adhering the coagulant to the dip mold, taking out the dip mold, and drying the dip mold at 70° C. to 150° C.

According to an exemplary embodiment of the present invention, the step (S200) may be a step of immersing the dip mold to which the coagulant is adhered in the latex composition for dip molding according to the present invention for forming the dip molding layer, and taking out the dip mold and forming the dip molding layer in the dip mold. In addition, according to an exemplary embodiment of the present invention, in the step (S200), during immersion, the immersion may be performed for 1 minute or more, for forming a dip molding layer on the dip mold.

According to an exemplary embodiment of the present invention, the step (S300) may be step of heating the dip molding layer formed on the dip mold to evaporate a liquid component, and crosslinking the latex composition for dip molding to proceed with the curing, for obtaining the dip-molded article. Here, when the latex composition for dip molding according to the present invention is used, crosslinking by vulcanization and/or an ionic bond of the crosslinker composition included in the latex composition for dip molding may be performed. In addition, according to an exemplary embodiment of the present invention, the heating may be performed by primary heating at 70° C. to 150° C. for 1 minute to 10 minutes and then secondary heating at 100° to 180° for 5 minutes to 30 minutes.

According to an exemplary embodiment of the present invention, the molded article may be gloves such as surgical gloves, examination gloves, industrial gloves, and household gloves, condoms, catheters, or health care products.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLE

Example 1

<Preparation of Carboxylic Acid-Modified Nitrile-Based Copolymer Latex Composition>

A 10 L high-pressure reactor equipped with a stirrer, a thermometer, a cooler, an entrance for nitrogen gas, and a feeding entrance for continuously adding monomers, an emulsifier, and an initiator, was subjected to nitrogen substitution, and 100 parts by weight of a monomer mixture of 30 wt % of acrylonitrile, 62 wt % of 1,3-butadiene, 4 wt % of methacrylic acid, 2 wt % of β-carboxyethyl acrylate, and 2 wt % of sodium 1-allyloxy-2-hydroxylpropyl sulfonate, 3 parts by weight of sodium alkylbenzene sulfonate, 0.6 parts by weight of t-dodecyl mercaptan, and 140 parts by weight of ion exchange water were added thereto and heated to 38° C. After heating was completed, 0.3 parts by weight of potassium persulfate as a polymerization initiator was added to proceed with polymerization, and when a polymerization conversion rate reached 95%, 0.1 parts by weight of sodium dimethyldithiocarbamate was added to stop the polymerization. Thereafter, unreacted monomers were removed by a deodorization process, and ammonia water, an antioxidant, and a defoamer were added, thereby obtaining a carboxylic acid-modified nitrile-based copolymer latex composition at pH 8.5 having a solid content concentration of 45 wt %.

<Preparation of Latex Composition for Dip Molding>

1 part by weight of sulfur, 0.7 parts by weight of zinc di-n-butyldithiocarbamate (ZDBC), 1.5 parts by weight of zinc oxide, 1 part by weight of titanium oxide, a potassium hydroxide solution, and secondary distilled water were added to 100 parts by weight (based on solid content) of the thus-obtained carboxylic acid-modified nitrile-based copolymer latex composition to obtain a latex composition for dip molding at pH 10 having a solid content concentration of 16 wt %.

<Manufacture of Dip-Molded Article>

13 wt % of calcium nitrate, 86.5 wt % of water, and 0.5 wt % of a wetting agent (manufactured by Huntsman Corporation, Australia, product name: Teric 320) were mixed to prepare a coagulant solution, a hand-shaped ceramic mold was soaked in this solution for one minute, taken out, and dried at 80° C. for 3 minutes, and the coagulant was applied on the hand-shaped mold.

Then the hand-shaped mold to which the coagulant was applied was soaked in the latex composition for dip molding obtained above for one minute, taken out, dried at 80° C. for 1 minute, and soaked in water for 3 minutes. Again, the mold was dried at 80° C. for 3 minutes, and crosslinked at 125° C. for 20 minutes. Thereafter, the crosslinked dip molding layer was stripped from the hand-shaped mold to obtain a glove-shaped dip-molded article.

Example 2

The process was performed in the same manner as in Example 1, except that during the preparation of the carboxylic acid-modified nitrile-based copolymer latex composition, 100 parts by weight of a monomer mixture of 27 wt % of acrylonitrile, 60 wt % of 1,3-butadiene, 3 wt % of methacrylic acid, 5 wt % of β-carboxyethyl acrylate, and 5 wt % of sodium 1-allyloxy-2-hydroxypropyl sulfonate was added as the monomer mixture to the same reactor. Here, the thus-obtained carboxylic acid-modified nitrile-based copolymer latex composition had a solid content concentration of 45 wt % and a pH of 8.5.

Example 3

The process was performed in the same manner as in Example 1, except that during the preparation of the carboxylic acid-modified nitrile-based copolymer latex composition, 100 parts by weight of a monomer mixture of 28 wt % of acrylonitrile, 62 wt % of 1,3-butadiene, 2 wt % of methacrylic acid, 6 wt % of β-carboxyethyl acrylate, and 2 wt % of sodium 1-allyloxy-2-hydroxypropyl sulfonate was added as the monomer mixture to the same reactor. Here, the thus-obtained carboxylic acid-modified nitrile-based copolymer latex composition had a solid content concentration of 45 wt % and a pH of 8.5.

Comparative Example 1

The process was performed in the same manner as in Example 1, except that during the preparation of the carboxylic acid-modified nitrile-based copolymer latex composition, 100 parts by weight of a monomer mixture of 30 wt % of acrylonitrile, 64 wt % of 1,3-butadiene, and 6 wt % of methacrylic acid without using β-carboxyethyl acrylate and sodium 1-allyloxy-2-hydroxypropyl sulfonate was added as the monomer mixture to the same reactor. Here, the thus-obtained carboxylic acid-modified nitrile-based copolymer latex composition had a solid content concentration of 45 wt % and a pH of 8.5.

Comparative Example 2

The process was performed in the same manner as in Example 1, except that during the preparation of the carboxylic acid-modified nitrile-based copolymer latex composition, 100 parts by weight of a monomer mixture of 30 wt % of acrylonitrile, 62 wt % of 1,3-butadiene, 4 wt % of methacrylic acid, and 4 wt % of β-carboxyethyl acrylate without using sodium 1-allyloxy-2-hydroxypropyl sulfonate was added as the monomer mixture to the same reactor. Here, the thus-obtained carboxylic acid-modified nitrile-based copolymer latex composition had a solid content concentration of 45 wt % and a pH of 8.5.

Comparative Example 3

The process was performed in the same manner as in Example 1, except that during the preparation of the carboxylic acid-modified nitrile-based copolymer latex composition, 100 parts by weight of a monomer mixture of 30 wt % of acrylonitrile, 62 wt % of 1,3-butadiene, 6 wt % of methacrylic acid, and 2 wt % of sodium 1-allyloxy-2-hydroxypropyl sulfonate without using β-carboxyethyl acrylate was added as the monomer mixture to the same reactor. Here, the thus-obtained carboxylic acid-modified nitrile-based copolymer latex composition had a solid content concentration of 45 wt % and a pH of 8.5.

Experimental Example

Tensile properties such as tensile strength, elongation, and a modulus at 300%, syneresis, and appearance physical properties of each dip-molded article manufactured in Examples 1 to 3 and Comparative Examples 1 to 3 are shown in the following Table 1, together with the monomer composition of each carboxylic acid-modified nitrile-based copolymer.

Tensile properties (tensile strength, elongation, and modulus at 300%): the dip-molded article obtained in each of the Examples and Comparative Examples was used to manufacture a dumbbell-shaped specimen, in accordance with ASTM D-412. This specimen was drawn at an elongation speed of 50 mm/min using a universal testing machine (UTM), the tensile strength and elongation at the time of breakage were measured, and a stress when the elongation was 300% (modulus at 300%) was measured. The higher the tensile strength and elongation are, the better the tensile properties are, and the lower the modulus at 300% is, the better the wearing sensation is.

Syneresis (min): a hand-shaped ceramic mold was soaked in a coagulant solution used in the manufacture of the dip-molded article for one minute, taken out, and dried at 80° C. for 3 minutes to apply the coagulant on the hand-shaped mold. Thereafter, the hand-shaped mold to which the coagulant was applied was soaked in the latex composition for dip molding of each of the Examples and the Comparative Examples for one minute and taken out, and a time when water droplets fell from the hand-shaped mold was measured. When the droplets did not fall within 5 minutes, X was indicated.

Appearance properties: It was confirmed whether the manufactured dip-molded article had a flow mark of an aggregate on the exterior, and o was indicated when there was no abnormality and x was indicated when there was an abnormality. Here, for the flow mark, when a mark of 5 cm or more caused by a flow of the latex composition for dip molding was shown in the hand-shaped mold, it was determined that there was an abnormality.

TABLE 1

| Classification | | | Example | | | Comparative Example | | |
|---|---|---|---|---|---|---|---|---|
| | | | 1 | 2 | 3 | 1 | 2 | 3 |
| Monomer composition | AN[1] | (wt %) | 30 | 27 | 28 | 30 | 30 | 30 |
| | BD[2] | (wt %) | 62 | 60 | 62 | 64 | 64 | 62 |
| | MA[3] | (wt %) | 4 | 3 | 2 | 6 | 4 | 6 |
| | β-CEA[4] | (wt %) | 2 | 5 | 6 | — | 2 | — |
| | AHPS[5] | (wt %) | 2 | 5 | 2 | — | — | 2 |
| | Total | (wt %) | 100 | 100 | 100 | 100 | 100 | 100 |
| Tensile properties | Tensile strength | (MPa) | 38.1 | 39.0 | 37.7 | 37.1 | 37.3 | 33.5 |
| | Elongation | (%) | 646 | 672 | 664 | 647 | 637 | 620 |
| | Modulus at 300% | (MPa) | 5.9 | 5.6 | 5.6 | 6.0 | 6.0 | 6.0 |
| | Syneresis | (min) | x | x | x | 2 | 2.5 | 2 |
| Appearance physical properties | — | | o | o | o | x | x | x |

[1] AN: acrylonitrile
[2] BD: 1,3-butadiene
[3] MA: methacrylic acid
[4] β-CEA: β-carboxyethyl acrylate
[5] AHPS: sodium 1-aryloxy-2-hydroxypropyl sulfonate As shown in Table 1, it was confirmed that in Examples 1 to 3 prepared according to the present invention, the tensile properties, the syneresis, and the appearance physical properties were excellent.

However, it was confirmed that in Comparative Example 1 in which the carboxyalkyl (meth)acrylate monomer and the ethylenic unsaturated sulfonic acid monomer were not included, Comparative Example 2 in which only the carboxyalkyl (meth)acrylate monomer was included, and Comparative Example 3 in which only the ethylenic unsaturated sulfonic acid monomer was included, the tensile properties were in an equivalent level to the Examples, but the syneresis and the appearance physical properties were reduced.

The invention claimed is:

1. A carboxylic acid-modified nitrile-based copolymer latex composition comprising a carboxylic acid-modified nitrile-based copolymer, wherein the carboxylic acid-modified nitrile-based copolymer comprises:
   60 wt % to 62 wt % of a conjugated diene-based monomer-derived repeating unit, wherein the conjugated diene-based monomer derived repeating unit is butadiene;
   27 wt % to 30 wt % of an ethylenic unsaturated nitrile-based monomer-derived repeating unit, wherein the ethylenic unsaturated nitrile-based monomer-derived repeating unit is acrylonitrile;
   2 wt % to 4 wt % of an ethylenic unsaturated acid monomer-derived repeating unit, wherein the ethylenic unsaturated acid monomer-derived repeating unit is methacrylic acid;
   2 wt % to 4 wt % of a carboxyalkyl (meth)acrylate monomer-derived repeating unit, wherein the carboxyalkyl (meth)acrylate monomer-derived repeating unit is β-carboxyethyl acrylate; and
   2 wt % to 5 wt % of an ethylenic unsaturated sulfonic acid monomer-derived repeating unit, wherein the ethylenic unsaturated sulfonic acid monomer-derived repeating unit is sodium 1-allyloxy-2-hydroxypropyl sulfonate;
   based on the total content of the carboxylic acid-modified nitrile-based copolymer; and wherein the ethylenic unsaturated sulfonic acid monomer-derived repeating unit and the carboxyalkyl (meth)acrylate monomer-derived repeating unit are included in a weight ratio of 1:1 to 3.

2. A latex composition for dip molding, the composition comprising: the carboxylic acid-modified nitrile-based copolymer according to claim 1; and a crosslinker composition.

3. The latex composition of claim 2, wherein the crosslinker composition includes zinc oxide, a vulcanizer, and a vulcanizing accelerator.

4. A molded article comprising a layer derived from the latex composition for dip molding of claim 2.

* * * * *